(12) United States Patent
Bogner

(10) Patent No.: US 8,187,140 B2
(45) Date of Patent: May 29, 2012

(54) PLANETARY GEAR MECHANISM

(75) Inventor: Michael Bogner, Eckental (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 985 days.

(21) Appl. No.: 12/147,659

(22) Filed: Jun. 27, 2008

(65) Prior Publication Data

US 2009/0005213 A1    Jan. 1, 2009

(30) Foreign Application Priority Data

Jun. 30, 2007   (DE) .......................... 10 2007 030 551

(51) Int. Cl.
*F16H 57/08*    (2006.01)

(52) U.S. Cl. ...................................... 475/331; 475/269

(58) Field of Classification Search .................. 475/149, 475/150, 263, 264, 331, 269; 192/41 S, 81 C
See application file for complete search history.

(56) References Cited

U.S. PATENT DOCUMENTS

| 4,858,494 | A | * | 8/1989 | Healy | ........................... 475/266 |
| 5,399,129 | A | * | 3/1995 | Ciolli | ........................... 475/301 |
| 7,007,780 | B2 | * | 3/2006 | Arnold et al. | ................... 192/21 |
| 2004/0110593 | A1 | * | 6/2004 | Szalony et al. | ............... 475/149 |

* cited by examiner

*Primary Examiner* — Roger Pang
*Assistant Examiner* — Huan Le
(74) *Attorney, Agent, or Firm* — Lucas & Mercanti, LLP; Klaus P. Stoffel

(57) ABSTRACT

A planetary gear mechanism which has at least one drive unit, at least one output unit and a freewheel unit. The freewheel unit is provided for blocking a moment which is introduced at the output unit.

7 Claims, 3 Drawing Sheets

PLANETARY GEAR MECHANISM

CROSS-REFERENCE TO RELATED APPLICATIONS

Figure 1:
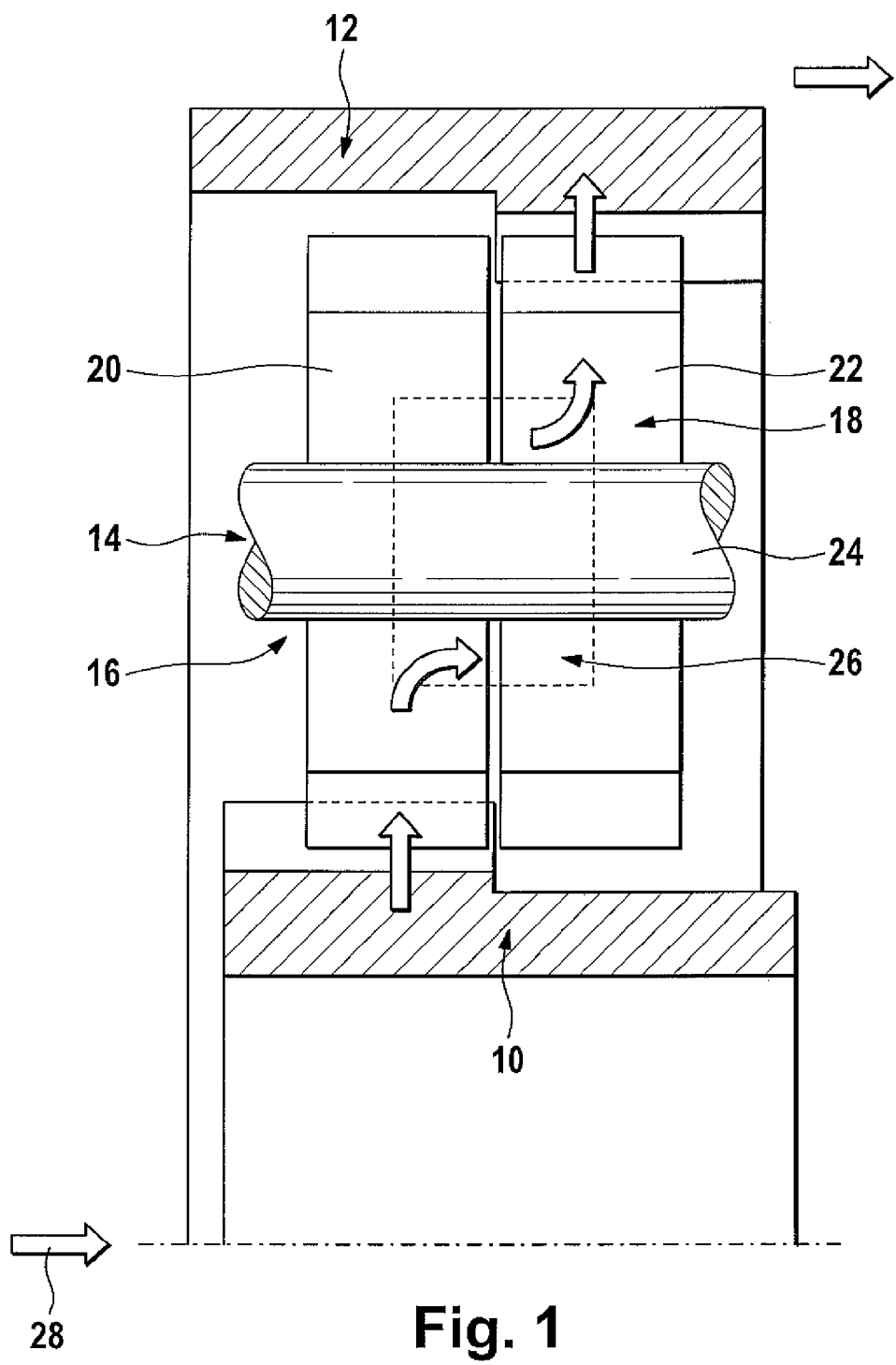

This application claims the priority of DE 10 2007 030551.8 filed Jun. 30, 2007, and this application is incorporated by reference herein.

FIELD OF THE INVENTION

The invention relates to a planetary gear mechanism.

BACKGROUND OF THE INVENTION

Planetary gear mechanisms are already known having at least one drive unit and at least one output unit.

SUMMARY OF THE INVENTION

The invention is based on the object of providing a unidirectionally active planetary gear mechanism with a particularly compact design.

Advantages of the Invention

Broadly the present invention relates to a planetary gear mechanism having at least one drive unit and at least one output unit.

The planetary gear mechanism comprises a freewheeling unit which is provided for blocking a moment which is introduced at the output unit. Here, a "freewheeling unit" is advantageously understood as a unit which has a switching behavior which is dependent on a direction of a force flow. "Blocking" of a moment is to be understood, in particular, as meaning that the moment is guided to a rotationally fixed connection and is blocked there or that a rotational movement of a component, the moment rests against, is prevented relative to a second component. "Provided" is to be understood, in particular, specifically as especially equipped, designed and/or programmed.

A unidirectionally active planetary gear mechanism having a particularly compact design can be realized simply by a freewheeling unit. A planetary gear mechanism of this type is advantageous, in particular, for operations, in which a moment is to be blocked at the output unit, such as in the case of increased loads, for example. A moment which is exerted by the increased load is conducted away by the planetary gear mechanism and the provision of a holding moment for holding the increased load, for example by a motor unit or a brake unit or a locking unit, can be dispensed with, as a result of which components, installation space and construction costs can be saved.

Furthermore, it is proposed that the freewheeling unit is provided for blocking the introduced moment independently of a rotational direction of the moment which is introduced at the output unit. Forwarding of any arbitrary moment which is introduced at the drive unit can be blocked by a corresponding refinement, as a result of which the planetary gear mechanism can be used in a particularly flexible way. A planetary gear mechanism of this type can be used particularly advantageously in a motor vehicle having an electric motor unit. In a stopping situation, in which a moment acts on the electric motor unit, such as on a hill, the moment would be blocked and the motor vehicle would not roll away, independently of the direction, in which the motor vehicle is stopped on the hill.

Furthermore, it is proposed that the freewheeling unit is provided for forwarding a moment which is introduced at the drive unit to the output unit. As a result, components and installation space can be reduced further. In particular, additional components for introducing a moment can be dispensed with, as a result of which the planetary gear mechanism becomes more compact. A planetary gear mechanism of this type is advantageous, in particular, for increasing a load, since the moment can be introduced directly via the planetary gear mechanism.

It is proposed that the freewheeling unit is provided for forwarding the introduced moment to the output unit independently of a rotational direction of the moment which is introduced at the drive unit. Any desired moment which is introduced at the drive unit can be forwarded as a result of a corresponding refinement, as a result of which the planetary gear mechanism can be used in a particularly flexible manner. An electric motor unit could advantageously drive a motor vehicle with a planetary gear mechanism which is conFigured according to the invention in a forward direction and a reverse direction, and a unit which changes a rotational direction of the output unit could be dispensed with.

It is proposed in a further refinement of the invention that the freewheeling unit is of self locking configuration. "Self locking" is to be understood, in particular, as meaning that the freewheeling unit is of self switching configuration and is independent of external actuators. Components, installation space and construction costs can be saved as a result.

Furthermore, it is proposed that the freewheeling unit comprises a wrap spring unit. A self locking freewheeling unit which acts independently of the rotational directions of the moments which are introduced at the drive unit and at the output unit can be provided in a particularly simple manner by a wrap spring freewheel.

Furthermore, it is proposed that the planetary gear mechanism comprises a planetary gear unit having at least one planetary gear which is of at least two part configuration. A planetary gear of two part configuration is advantageous for the arrangement of the freewheeling unit.

If a first part of the planetary gear which is connected to the drive unit is decoupled from a second part of the planetary gear which is connected to the output unit, the freewheeling unit can be arranged particularly advantageously between the parts of the planetary gear mechanism.

It is proposed that the freewheeling unit is provided for forwarding a moment which is introduced at the drive unit from the first part to the second part of the planetary gear. As a result, additional units, on which the freewheeling unit acts, can be dispensed with and the planetary gear mechanism can be of particularly compact design. In particular, if the freewheeling unit acts independently of the rotational direction of the introduced moment, components can be reduced.

Furthermore, it is proposed that the freewheeling unit is provided for diverting a moment which is introduced at the output unit away from the second part of the planetary gear to a planetary gear carrier. As a result, the moment can be advantageously be diverted away and additional components can be dispensed with, as a result of which a compact and inexpensive planetary gear mechanism according to the invention can be realized. In particular, if a relative rotational movement between the second part of the planetary gear and the planetary gear carrier is blocked independently of the rotational direction of the moment which is introduced at the output unit, the planetary gear mechanism can be of particularly compact design.

DRAWING

Further advantages result from the following description of the drawings. One exemplary embodiment of the invention is shown in the drawings. The drawings, the description and the claims contain numerous features in combination. A person skilled in the art will also expediently consider the features individually and combine them to form appropriate further combinations.

Figure 2:
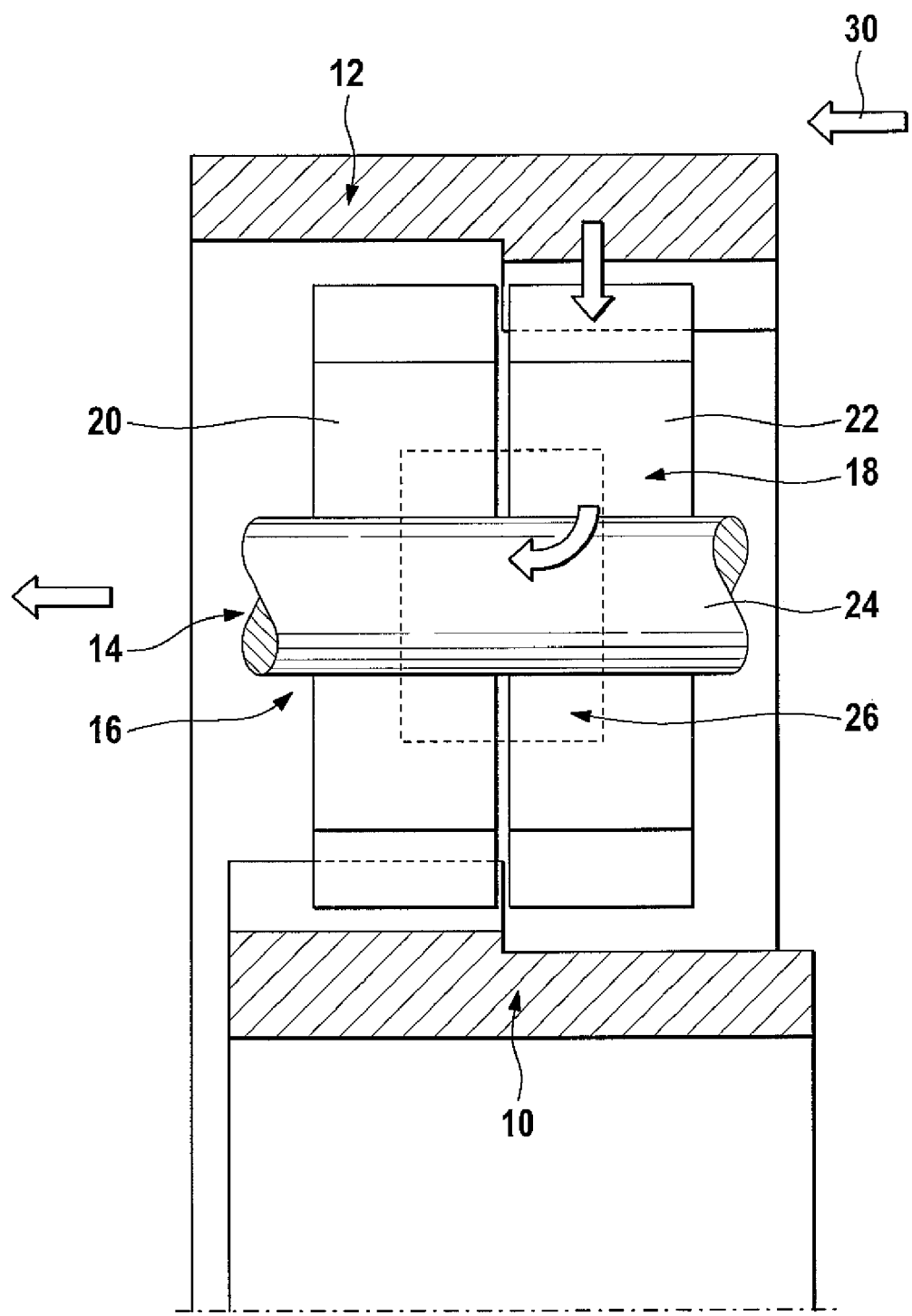
Figure 3:
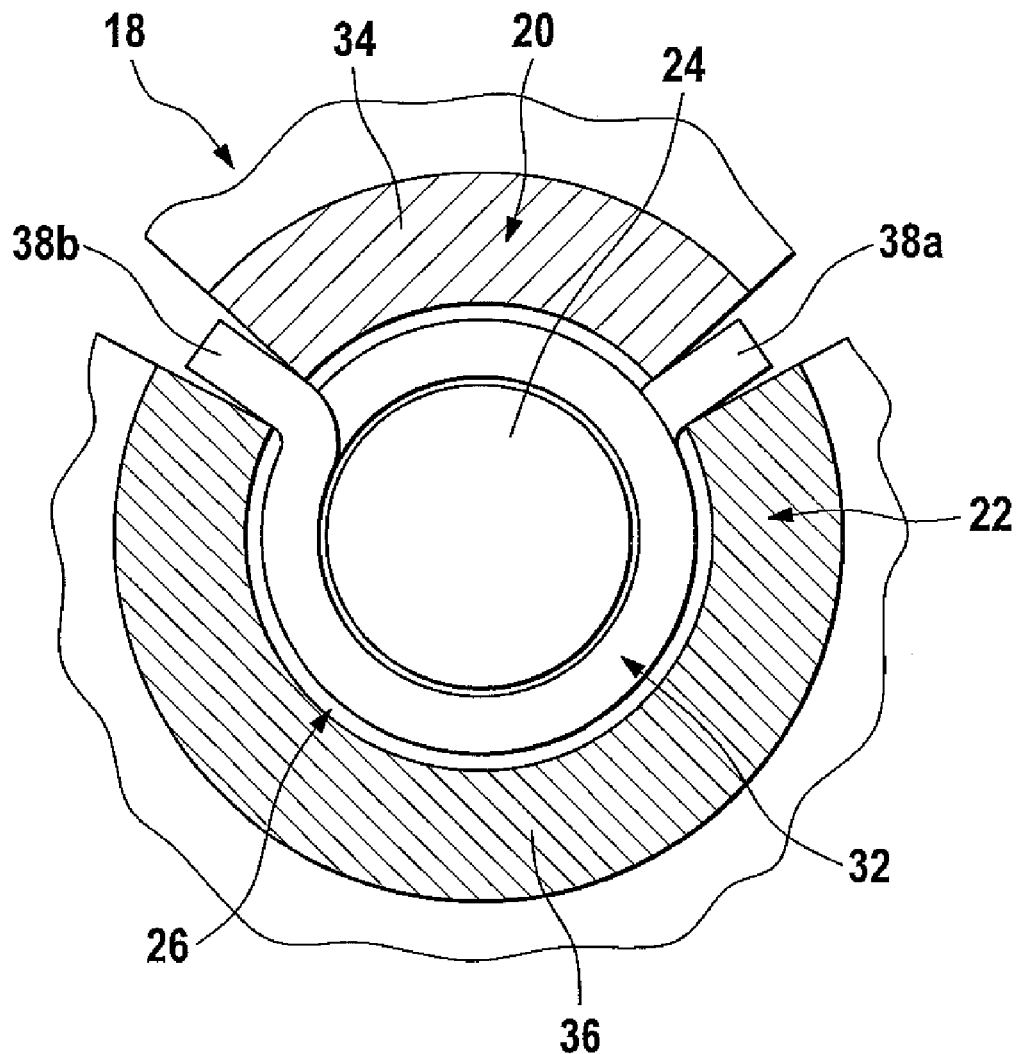

In the drawings:

FIG. 1 shows a detail of a planetary gear mechanism according to the invention having a first force flow of a moment which is introduced at an output unit in a planetary gear mechanism according to the invention, FIG. 2 shows a force flow of a moment which is introduced at an output unit, and FIG. 3 shows a freewheeling unit of the planetary gear mechanism having a wrap spring unit.

DESCRIPTION OF THE EXEMPLARY EMBODIMENT

FIGS. 1 and 2 show a basic arrangement of a planetary gear mechanism according to the invention having a drive unit 10 and an output unit 12.

A sun gear of the planetary gear mechanism is configured as the drive unit 10 and an internal gear is conFigured as the output unit 12. A planetary gear unit 16 is arranged on a planetary gear carrier 14. It is assumed for a further functional description that the planetary gear carrier 14 is arranged in a stationary and, in particular, rotationally fixed manner.

The planetary gear unit 16 comprises a planetary gear 18 of two part configuration. A first part 20 of the planetary gear 18 meshes with the drive unit 10, and a second part 22 of the planetary gear 18 meshes with the output unit 12. The two parts 20, 22 of the planetary gear 18 are decoupled. They are arranged on an axle 24 which is conFigured integrally with the planetary gear carrier 14.

A freewheeling unit 26 is arranged between the parts 20, 22 of the planetary gear 18. A moment 28 which is introduced at the drive unit 10 is forwarded by the freewheeling unit 26 from the first part 20 of the planetary gear 18 to the second part 22 of the planetary gear 18 independently of a rotational direction of the drive unit 10, which second part 22 of the planetary gear 18 then in turn forwards it to the output unit 12. If a moment 30 is introduced at the output unit 12, said moment 30 is conducted away to the planetary gear carrier 14 by the freewheeling unit 26 independently of a rotational direction of the output unit 12. The moment 30 which is introduced in this way is blocked. The freewheeling unit 26 is of self locking configuration and is independent of external actuators.

The freewheeling unit 26 comprises a wrap spring unit 32 (FIG. 3). An internal diameter of the wrap spring unit 32 is configured to be smaller than an external diameter of the axle 24 of the planetary gear carrier 14. As a result, the wrap spring unit 32 bears against the axle 24 of the planetary gear carrier 14 in the unloaded state.

If the moment 28 is introduced via the first part 20 of the planetary gear 18 which meshes with the drive unit 10 (FIG. 1), the wrap spring unit 32 is loaded in the opening direction with the moment 28 by a segment 34 of the first part 20 of the planetary gear 18 via one of two spring limbs 38a, 38b depending on the rotational direction. As a result, the internal diameter of the wrap spring unit 32 becomes larger, to be precise, in particular, larger than the external diameter of the axle 24 of the planetary gear carrier 14. The wrap spring unit 32 slides over the axle 24 of the planetary gear carrier 14 and the spring limb 38a, 38b produces a positively locking contact with a segment 36 of the second part 22 of the planetary gear 18. The moment 28 is transmitted from the first part 20 of the planetary gear 18 to the second part 22 of the planetary gear 18, and the entire planetary gear unit 16 can rotate on the axle 24 of the planetary gear carrier 14 relative to the planetary carrier 14. A force flow runs from the drive shaft 10 to the output shaft 12. The two spring limbs 38a, 38b are substantially identical with regard to their features and functions, but are advantageously conFigured for different rotational directions of the parts of the planetary gear 18.

The moment 28 which is introduced via the drive unit 10 is forwarded to the output unit 12 for all rotational directions of the drive unit 10, since the freewheeling unit 26 and both parts 20, 22 of the planetary gear 18 have a symmetry with regard to the rotational directions of the drive unit 10 and the output unit 12.

If the moment 30 is introduced via the second part 22 of the planetary gear 18 which meshes with the output unit 12 (FIG. 2), one of the spring limbs 38a, 38b is loaded with the moment 30 by the segment 36 of the second part 22 of the planetary gear 18, as a result of which the wrap spring unit 32 attempts to constrict itself further. However, further constriction of the wrap spring unit 32 is prevented by the contact of the wrap spring unit 32 with the axle 24 of the planetary gear carrier 14. A surface pressure between the wrap spring unit 32 and the axle 24 of the planetary gear carrier 14 increases as a function of the magnitude of the introduced moment 30. A rotation of the second part 22 of the planetary gear 18 relative to the axle 24 of the planetary gear carrier 14 is averted on account of the friction which is produced as a result. The introduced moment 30 is conducted away to the planetary gear carrier 14 via the axle 24 and is blocked there. The first part 20 of the planetary gear 18 and therefore also the drive unit 10 remain unloaded by a moment. A force flow runs from the output unit 12 to the planetary carrier 14 and is conducted away there.

On account of the symmetry, the planetary gear mechanism is self locking for all rotational directions of the output unit 12 or locks in the reverse direction.

LIST OF THE DESIGNATIONS

10 Drive unit
12 Output unit
14 Planetary gear carrier
16 Planetary gear unit
18 Planetary gear
20 Planetary gear part
22 Planetary gear part
24 Axle
26 Freewheeling unit
28 Moment
30 Moment
32 Wrap spring unit
34 Segment
36 Segment
38 a,b Spring limb

The invention claimed is:

1. Planetary gear mechanism comprising:
at least one drive unit;
at least one output unit;
at least one planetary gear unit having at least one planetary gear, which is of a two part configuration; and
a freewheeling unit, which is provided for blocking a moment introduced independently of a rotational direction of the moment at the output unit, having a wrap spring.

2. The planetary gear mechanism according to claim 1, wherein the freewheeling unit is self-locking.

3. The planetary gear mechanism according to claim 1, wherein a first part of the planetary gear which is connected to the drive unit is decoupled from a second part of the planetary gear which is connected to the output unit.

4. The planetary gear mechanism according to claim 1, wherein the freewheeling unit is provided for forwarding a moment which is introduced at the drive unit from the first part to the second part of the planetary gear.

5. The planetary gear mechanism according to claim 1, wherein the freewheeling unit is provided for diverting the moment which is introduced at the output unit away from the second part of the planetary gear to a planetary gear carrier.

6. The planetary gear mechanism according to claim 1, wherein the freewheeling unit is provided for forwarding a moment which is introduced at the drive unit to the output unit.

7. The planetary gear mechanism according to claim 6, the freewheeling unit is provided for forwarding the introduced moment to the output unit independently of a rotational direction of the moment which is introduced at the drive unit.

* * * * *